UNITED STATES PATENT OFFICE

2,412,699

WETTABLE COATING FOR VINYLITE SHEETING

George P. Waugh and William O. Kenyon, Rochester, N. Y., assignors to Eastman Kodak Company, Rochester, N. Y., a corporation of New Jersey No Drawing. Application February 12, 1944, Serial No. 522,144

2 Claims. (Cl. 106—179)

This invention relates to a composition eminently suited for forming coatings on surfaces which coatings are readily wet with water but are resistant to removal.

Often surfaces are desirable in which upon contact with water, the water will spread over the surface rather than collect together in drops or give other evidence of unevenness. Various materials will assure an evenness of wetting with water on a surface, but in all the known instances such coatings have been more or less easily removable with continued washing or immersion in water.

One object of our invention is to provide a coating composition which can be coated upon surfaces to which uniform wetting with water is desirable. Another object of our invention is to provide a water-wettable coating composition which will result in coatings which are difficultly removable, even though subjected to treatment with water for long periods. Other objects of our invention will appear herein.

We have found that a solution of a far-hydrolyzed lower fatty ester of cellulose, such as cellulose acetate having an acyl content of 22–25% when dissolved in a mixture of ethyl lactate, methyl Cellosolve acetate, alcohol and water may be coated out and the coating dried to form a readily wettable surface which none the less does not swell, soften or disintegrate by the action of water. We have found that a composition comprising approximately 1 part of ethyl lactate, 1 part of methyl Cellosolve acetate and from 1 to 2 parts of a 10% solution of the far-hydrolyzed cellulose acetate in 45% aqueous alcohol forms the composition which is eminently suited for the purposes specified herein.

The far-hydrolyzed cellulose acetate may be prepared by the process described in Fordyce Patent No. 2,129,052 or in Crane Patent No. 2,327,770, the hydrolysis being continued until the cellulose acetate has an acetyl content of approximately 23%. This ester, if not already in solution in aqueous alcohol, is dissolved therein, and the composition in accordance with my invention is formed by mixing ethyl lactate and methyl Cellosolve acetate therewith. The proportions of the various solvents may be varied to some extent, the sole criterion being that a composition is formed which upon coating out will give a coating readily wet with water and physically resistant to soaking with water. We have found that lower fatty esters of cellulose and particularly those acetyl esters having a low acetyl content are particularly suited for the purposes of our invention.

As an example of the use of our invention, a strip of Vinylite sheeting made up of a copolymer of vinyl chloride and vinyl acetate was coated by brushing thereon a mixture of 1 part of ethyl lactate, 1 part of methyl Cellosolve acetate and 1 part of a 10% solution of hydrolyzed cellulose acetate having an acetyl content of approximately 23½% in approximately 45% aqueous ethyl alcohol. The coating was allowed to dry at room temperature. The surface when dry was somewhat hazy, almost to the point of opaqueness. It was found, however, to be evenly and smoothly wet with water. When wet, the coating was practically transparent, and after drying again it was much less opaque than originally. It was found that soaking the coating in water for a long period, such as at least 40 hours, and drying did not affect the quality of the coating nor did it cause the coating to soften so that it easily rubbed off, thus distinguishing from other compositions which might form readily wettable surfaces.

We claim:

1. A composition adapted to form permanent water-wettable surfaces essentially consisting of 1 part of ethyl lactate, 1 part of methyl Cellosolve acetate, and 1 to 2 parts of a 10% solution of cellulose acetate having an acetyl content of 22–25% in approximately 45% aqueous alcohol, which composition is adapted to form a coating wettable with water but not disintegrated upon continued immersion therein.

2. A composition adapted to form permanent water-wettable surfaces essentially consisting of one part of ethyl lactate, one part of methyl Cellosolve acetate, and one part of a 10% solution of cellulose acetate having an acetyl content of 22–25% in approximately 45% aqueous ethyl alcohol, which composition is adapted to form a coating wettable with water but not disintegrated upon continued immersion therein.

GEORGE P. WAUGH.
WILLIAM O. KENYON.